Nov. 2, 1965          F. HANSALIK          3,215,286
KAISER ROLL REVERSING MACHINE
Filed May 6, 1963                       2 Sheets-Sheet 2
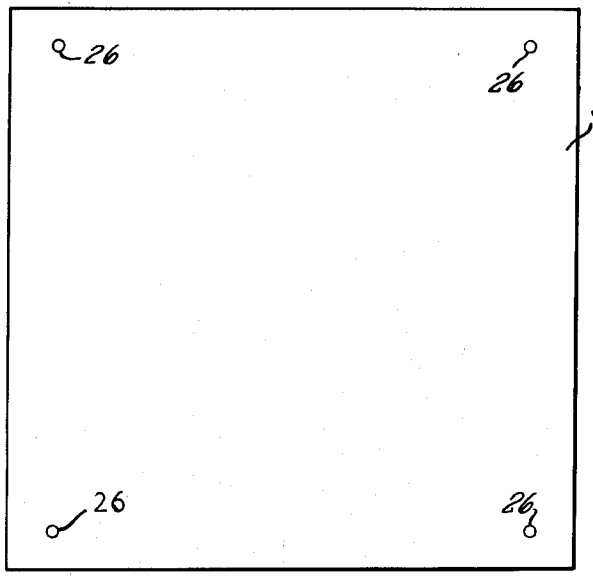
FIG. 5
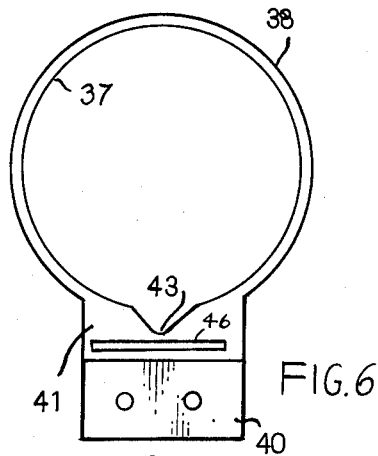
FIG. 6
FIG. 7
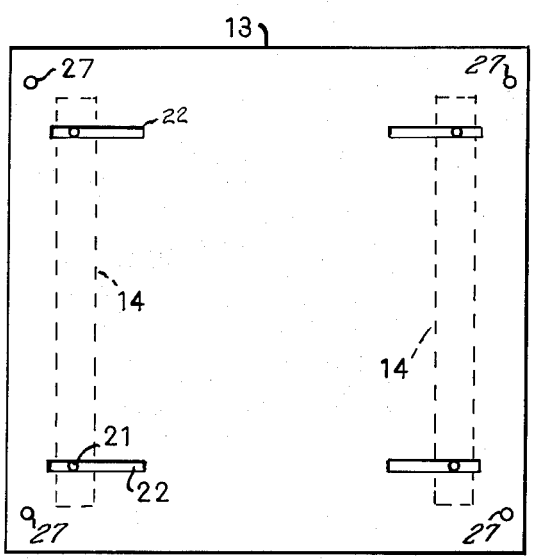
FIG. 9
FIG. 8
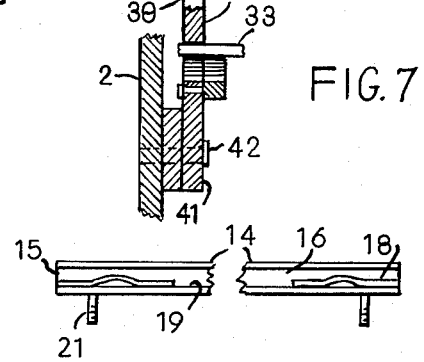
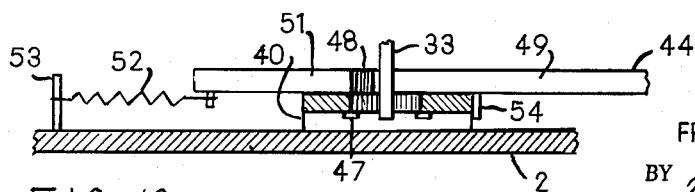
FIG. 10
INVENTOR.
FREDERICK HANSALIK
BY Nicholas J. Garofalo
ATTORNEY United States Patent Office 3,215,286
Patented Nov. 2, 1965

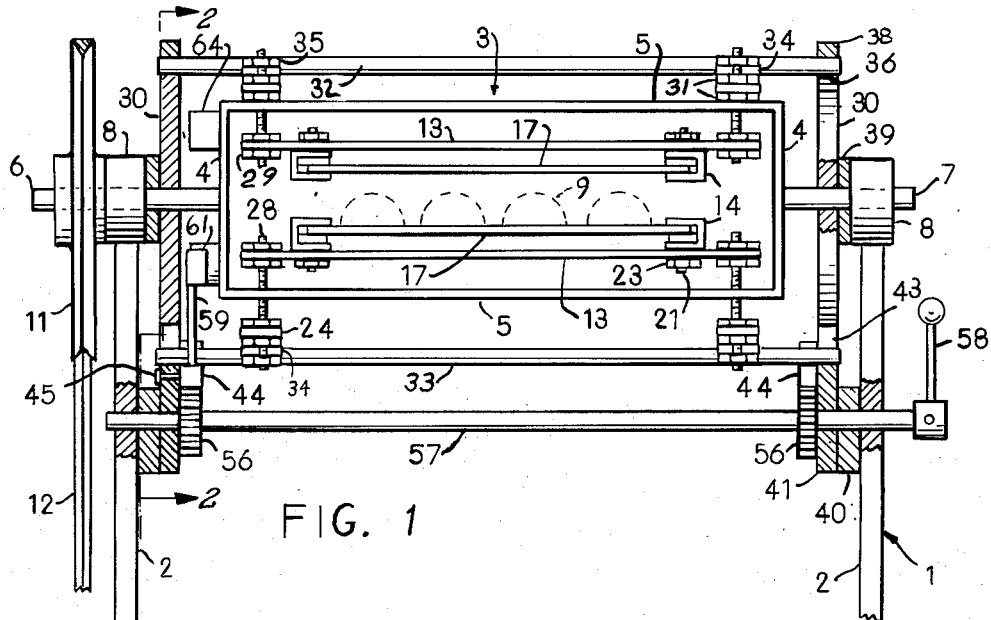

3,215,286
KAISER ROLL REVERSING MACHINE
Frederick Hansalik, 64 Island Parkway, Island Park, N.Y.
Filed May 6, 1963, Ser. No. 278,270
8 Claims. (Cl. 214—1)

This invention is concerned with new and useful improvements in bakery machinery. It is particularly concerned with a kaiser roll reversing machine.

A kaiser roll, known also as a hard or star roll, is characterized by a star design formed in its upper surface. This design is cut or impressed into the surface of the roll while the roll is in its soft dough stage and before it has been entered into the oven.

In bakeries where kaiser rolls are made in large quantities the rolls are required to stand for various periods in the soft dough condition until ovens are available to receive them. To avoid undesirable sagging of the rolls and consequent distortion of the star design during this waiting period, the rolls are customarily arranged in their soft dough condition on peel boards with the star design surface downward. When the ovens are ready to receive the rolls for baking, the rolls are reversed on the peel boards with their star designs facing upward. The rolls are then entered right-side, that is star design upward in the oven. The operation of reversing the rolls is done manually. In large bakeries considerable oven time is lost and labor expended as this operation of reversing the rolls takes place.

The object of this invention is to eliminate this manual operation of reversing the rolls on the peel boards, and to provide a practical machine for performing such operation.

Another object of this invention is to provide a power operated kaiser roll reversing machine for reversing the positions of soft dough kaiser rolls on peel boards from a star down position to a star up position.

A further object of this invention is to provide a kaiser roll reversing machine which is efficient in its operation, economical in its structure, and practical for the purposes intended.

In accordance with this invention there is provided a supporting frame structure, a peel carrier rotatively supported in the frame structure and adapted to support a pair of peel boards therein in parallel relation disposed one above the other one of which peel boards is adapted to have thereon an array of soft dough kaiser rolls, and means for rotating the peel carrier through a half turn to a reverse position so that as a consequence of such turning the positions of the peel boards are also reversed and the soft dough rolls are caused to obtain on the other of the peel boards a reverse position.

The invention further lies not only in the particular construction and arrangement of its component parts, but also lies in the particular manner in which these parts cooperate with each other to effect the results intended herein.

The foregoing objects and advantages, as well as others, will appear more fully hereinafter from a consideration of the detailed description which follows, taken together with the accompanying drawings wherein an embodiment of the invention is illustrated. It is to be expressly understood, however, that the drawings are for purposes of illustration and description and they are not to be construed as defining the limits of the invention.

In the accompanying drawings:

FIG. 1 is a front elevational view of the machine illustrating the invention, some parts being sectioned for better illustration;

FIG. 2 is a view taken on line 2—2 of FIG. 1;

FIG. 3 is a fragmentary plan view of an end of the peel carrier;

FIG. 4 is a side view of FIG. 3;

FIG. 5 is a plan view of a horizontal panel member of the peel carrier;

FIG. 6 is a detail of the track guide plate;

FIG. 7 is a section taken on line 7—7 of FIG. 2, but showing the track runner in its elevated condition;

FIG. 8 is a side elevational view of one of the peel board supporting shelf members;

FIG. 9 is a plan view of a shelf plate; and

FIG. 10 is a section taken on line 10—10 of FIG. 2.

In the several figures of the drawings is disclosed a kaiser roll reversing machine illustrating the invention. It includes a rigid suporting frame structure 1 having a pair of opposed vertical side members 2 between the upper ends of which a peel carrier 3 is supported for rotation.

The peel carrier is of open ended rectangular tubular construction. It has a pair of opposed parallel side panels 4 which are integral with a pair of opposed parallel panels 5. The latter normally lie in horizontal planes, one above the other. Rigid with and extending axially from the centers of the outer faces of the side panels 4 is a pair of shafts, respectively designated by the numerals 6 and 7. These shafts have a horizontal axis, and are supported for rotation in bearing blocks 8 defined by the upper ends of the frame members 2. Shaft 6 projects beyond its bearing block and carries on its end a pulley 11 which is drivable by a belt 12. The latter is connected to a motor driven pulley, not shown. Upon energization of a suitable electric motor, mounted in the framework but not shown, the peel carrier 3 is caused through the belt 12 and pulley 11 to rotate about its axis at a slow rate of speed. Means is provided, as will be later described, to cause the peel carrier to automatically come to rest after it has been rotated through a half turn.

The peel carrier further includes a pair of rectangular peel shelf plates (FIGS. 1 and 9) designated by the numerals 13. Mounted transversely of the inner face of each shelf plate is a separate pair of elongated peel board supporting shelf members 14 (FIGS. 1, 8 and 9). Each shelf member has the configuration of a U-channel lying on its side; and it is open at opposite ends 15. The shelf members associated with a shelf plate are disposed in opposed spaced parallel relation to each other and in such manner that the open channels 16 thereof face one another. A separate peel board 17 is adapted to be supported at correspondingly marginal edges thereof in the opposed channels 16 of each shelf member 14. The peel boards may be inserted into or removed from the channels 16 of the shelf members through either of the open ends 15 of the latter. Leaf springs 18 fixed within each channel 16 to a wall 19 thereof serve to frictionally retain the peel board within the channels against slidable escape during rotation of the peel carrier.

So as to accommodate peel boards of different lateral dimensions, the shelf members 14 associated with each shelf plate 13 are adjustable, as needed, relative to the plate 13 toward each other. To this end, a desirable mounting arrangement of each shelf member to its plate 13 is provided. In this respect, each shelf member has a pair of threaded studs 21 extending vertically from opposite end areas of the surface of the outer wall of the shelf member. Each stud extends slidably through a separate laterally extending slot 22 formed in the associated shelf plate. Because of this arrangement the shelf members of a shelf plate may be adjusted along the slots in a lateral direction toward or away from each other to any desired spaced relation. The shelf members are then subject to being locked fast in their adjusted positions by tightening nuts 23 on the studs against the outer face of the shelf plate.

The shelf plates 13 are arranged within the peel carrier 3 in opposed parallel spaced relation, one above the other. Each shelf plate is suspended within the peel carrier in parallel spaced relation to one of the panels 5 by means of nuts and stud bolts from a separate pair of bars 24 located externally of the peel carrier. The bars 24 in each pair thereof extend parallel to each other and transversely relative to opposite marginal areas of the corresponding panel 5 of the peel carrier. Each bar 24 has a hole 25 at each end thereof. This hole registers with a separate corner hole 26 in the related panel 5, and further registers with a separate corner hole 27 in the related shelf plate 13. A separate stud 28 extends with a slide fit through each group of registered holes 25, 26, and 27. A pair of nuts 29 threaded fast on the inner end of each stud 28 against opposite faces of the related shelf plate holds the latter rigid to the stud. A second pair of nuts 31 threaded fast on the outer end of each stud against opposite faces of the related bar 24 hold the stud rigid to the bar. By this arrangement each shelf plate 13 may be raised or lowered within the peel carrier relative to the other by raising or lowering the associated bars 24.

Means is provided for mechanically effecting at predetermined times the lowering and raising of one of the shelf plates relative to the other. To this end, a separate track runner defined by a cylindrical shaft is associated with each pair of bars 24. One of the track runners is identified by the numeral 32, and the other by the numeral 33. They are of identical construction and similarly associated with their related bars 24. Each track runner extends laterally over the centers of the related bars. Fixed, as by welding to each end of a track runner is a short bar 34; and each bar 34 is anchored by means of bolts and nuts 35 to a separate one of the bars 24. The end portions of the track runners extend beyond the related bars 24 and 34, and are adapted during rotation of the peel carrier 3 to ride around a pair of opposed annular tracks 36. Each track is defined by a cylindrical disk collar 30 arranged concentrically with and in spaced relation to the inner annular wall 37 of a surrounding track runner guide plate 38 (FIGS. 1, 2, and 6). The disk collars 30 are fixed in suitable manner, as by keys not shown, to the corresponding shafts 6 and 7. A spacer 39 serves to space each collar 30 a desirable distance from the corresponding bearing block 8. A further spacer 40 disposed between a mounting plate portion 41 of each guide plate and the corresponding frame member 2 serves to space the guide plate a desirable distance from the frame structure. Bolts 42 serve to anchor the guide plate, spacer and frame member fast to one another.

In the normal horizontal condition of the peel carrier 3, as in FIG. 1, one of the track runners will have an upper position, as indicated by the track runner 32; and the other will have a lower position, as indicated by the track runner 33 diametrically opposed having its ends resting in wells 43. A well 43 is formed in each guide plate below the associated collar 30. In this normal condition of the peel carrier the lower track runner cooperates with the adjacent wall areas of the wells 43 to restrain the peel carrier against rotation.

In this normal condition of the peel carrier the shelf plates 13 have a predetermined spaced relation to one another. This spaced relation may be adjustably increased or decreased by loosening the nuts 29, raising or lowering the shelf plates as desired relative to the threaded studs 28, and then re-tightening the nuts in the newly adjusted positions of the shelf plates. When assembling the peel carrier the studs 28 may be adjusted relative to the shelf plates to obtain a desired level condition of the latter.

In preparing the machine for operation, an empty peel board is inserted between the shelf members 14 of the upper shelf plate; and a peel board having an array of soft dough rolls 9 thereon in an upside-down condition is inserted between the shelf members 14 of the lower shelf plate, as appears in FIG. 1.

Suitable mechanical means is provided to elevate the lower shelf plate relative to the upper shelf plate sufficiently to cause the soft dough rolls to press lightly against the peel board carried by the upper shelf plate, so that the soft dough rolls will not slip free of the peel carrier and peel boards when the peel carrier is subsequently rotated. This mechanical means includes a pair of cam rack bars 44, one associated with each guide plate 38. Each cam bar 44 has slidable movement relative to the inner face of the mounting plate portion 41 of the related guide plate 38. The cam bar is guided in this movement by means of pins 45 projecting from its side and movable in a slot 46 extending transversely of the mounting plate portion 41. Heads 47 on the pins retain the cam bar in bearing relation to the related mounting plate 41. Each cam bar 44 has a cam surface 48 which is inclined rearwardly, rising from a lower level surface 49 to an upper level surface 51. A separate return spring 52 anchored at one end to each cam bar and anchored at the other end to a stud 53 of the corresponding frame member 2 serves to bias the cam bar to a predetermined rearward position, as appears in FIG. 2. The rearward position of the cam bar is determined by a stop pin 54 on the bar which cooperates with a forward side of the related track runner guide plate 38. Each cam bar has a normal position as in FIG. 2 wherein the cam surface thereof is aligned with that of the other, and wherein the end portions of the lower track runner rest at the base of the cam surfaces 48 on the lower surfaces 49 of the bars, as indicated by the track runner designated 33. The forward end of each cam bar has a rack portion 55 which is engaged with a separate rack wheel 56. The rack wheels are fixed fast to opposite end portions of a crank shaft 57 which is rotatively supported at its end portions in the side frame members 2. When the handle 58 of the crank shaft is manually rotated a predetermined degree forwardly, both cam bars are caused to simultaneously slide or ride forwardly over the rack wheels. In this action the cam surfaces ride beneath the end portions of the lower track runner to move the latter onto the upper surfaces 51 of the cam bars. Whereupon the lower track runner will be raised out of the wells 43 and positioned in the tracks 36 so as to be able to ride about the latter, when the peel carrier is rotated.

Switch means at 59 is provided to cause energization of the motor driven belt 12 and consequent rotation of the peel carrier, after the lower track runner has been shifted into the tracks, as described above. The switch means includes a switch 61 mounted on one of the cam bars (FIGS. 1, 2). The switch has a spring biased control button 62. In the stopped or "at rest" condition of the peel carrier a cam block 63 mounted to a side panel 4 of the peel carrier presses against the control button so as to hold the latter in its electrically open condition. When the rack bar 44 supporting the switch 61 is drawn forwardly upon rotation of the crank shaft, the switch is carried away from the cam block causing the control button to be spring released to its electrically closed condition. This latter action will occur when the lower track runner is shifted into position for riding about the tracks 36. Upon closing of the switch the motor is energized to cause the peel carrier to rotate at a slow rate of speed. As soon as the peel carrier begins to rotate, the operator manually releases the crankshaft, whereupon the cam bars are returned by the springs 52.

A second cam block 64, identical to the cam block 63, is fixed in a diagonally opposite position on the same side panel 4 of the peel carrier. As the peel carrier completes a half turn to a reverse position, the second cam block 64 cooperates with the control button 62 to press the latter inwardly to its electrically open condition, whereupon the rotation of the peel carrier stops. As the peel carrier completes the half turn, its position will be reverse to that shown in FIG. 1 and the soft dough rolls which had an upside-down condition before rotation of the peel carrier will now have a right-side up condition. The rolls will now be resting on that peel board which had the upper position as in FIG. 1 before the peel carrier was rotated. Further, when the peel carrier completes the half turn of rotation, the track runner 32, which will now have the lower position, will be in register with the wells 43. As the latter event occurs, the track runner 32 will drop to the bottom of the wells, and as it does so it will draw the associated shelf plate and peel board with it. The appearance of the peel carrier in its reversed position will be the same as that shown in FIG. 1, except that the soft dough rolls will be right-side up. The peel board now supporting the rolls in their right-side up position may be withdrawn from the peel carrier and replaced with a fresh peel board containing soft dough rolls in an upside down condition in preparation for the next cycle of operation of the machine.

While an embodiment of the invention has been illustrated and described in detail, it is to be expressly understood that the invention is not limited thereto. Various changes can be made in the design and arrangement of the parts without departing from the spirit and scope of the invention; it is my intent, therefore, to claim the invention not only as shown and described, but also in all such forms and modifications thereof as may reasonably be construed to be within the spirit of the invention and the scope of the appended claims.

I claim:

1. A kaiser roll reversing machine comprising a supporting frame structure, a peel carrier rotatively supported in the latter and normally having a horizontal position, a pair of peel supporting shelf plates supported within the peel carrier in parallel opposed relation one above the other, motor powered means for causing rotation of the peel carrier through a half turn to a reverse horizontal position, a normally open electrical switch disabling operation of the motor powered means, and manually controlled means for simultaneously closing said switch to energize said motor powered means for rotation of said carrier through a half turn and moving one of the shelf plates a predetermined distance toward the other.

2. A kaiser roll reversing machine as in claim 1, wherein means is provided for causing the other of the shelf plates to automatically drop a predetermined distance relative to said one of the shelf plates upon the peel carrier completing said half turn of rotation.

3. A kaiser roll reversing machine comprising a supporting frame structure, a peel carrier rotatively supported in the latter normally having a horizontal position, a pair of peel supporting shelf plates supported within the peel carrier in parallel opposed relation one above the other, and means for causing rotation of the peel carrier through a half turn to a reverse horizontal position; wherein the peel carrier comprises a rectangular open ended tubular structure having a pair of shafts extending axially from the centers of opposite sides thereof, and bearing means is provided in the frame structure in which the said shafts are supported for rotation; and wherein the means for causing rotation of the peel carrier through a half turn to a reverse horizontal position comprises a motor driven connection with one of said shafts, a pair of switch control button actuating cams arranged at diagonally opposite corners of a side of the peel carrier, a switch having a slidable control button pressed in open condition against one of said cams, a slide bar located transversely of the frame structure to one side of the peel carrier supporting said switch, spring means biasing the slide bar in such manner that the control button is pressed in said open condition against said cam, stop means predetermining the biased position of the slide bar, means for manually drawing the slide bar relative to the frame structure so as to carry the switch and as a consequence the control button clear of said cam, the control button being adapted to be restored to a closed electrical condition upon being so drawn, whereby upon occurrence of said closed condition the motor driven connection is cused to be energized to rotate the peel carrier, the slide bar being adapted upon manual release to be restored under the bias of said spring to its predetermined position, and the other of said cams on completion of a half turn of the peel carrier being cooperable with the control button in the restored condition of the slide bar to electrically re-open the control button.

4. A kaiser roll reversing machine as in claim 1, wherein the shelf plates are suspended within the peel carrier from a pair of diametrically opposed track runners located externally of the peel carrier and parallel to the axis of rotation of the latter, and a pair of opposed annular track means is arranged coaxially with the shafts in which track means opposite end portions of the track runners are rideably disposed.

5. A kaiser roll reversing machine as in claim 4, wherein separate suspension means slidable in the peel carrier supports each shelf plate within the peel carrier in suspended relation to a separate one of the track runners.

6. A kaiser roll reversing machine as in claim 5, wherein each track means has a well at the bottom thereof in which a corresponding end portion of one of the track runners normally rests and determines the spaced relation of the shelf plates to one another.

7. A kaiser roll reversing machine as in claim 6, wherein said manually controlled means includes cam means provided for elevating said last mentioned track runner out of said wells into track running position and simultaneously with energization of the motor powered means to rotate the peel carrier.

8. A kaiser roll reversing machine of the character described comprising a supporting frame structure, a peel carrier rotatively supported in the frame structure having a horizontal axis of rotation, a pair of peel supporting shelf plates supported in the peel carrier one above the other in horizontal planes in predetermined spaced relation to each other, the said spaced relation being such that when soft dough kaiser rolls are arranged upon the lower one of the peels they will be clear of the other peel, means for moving the lower one of the peels toward the other a distance slightly greater than the said clearance of any rolls that might be on the lower peel so as to cause the rolls to be lightly compressed between the peels, and means for causing rotation of the peel carrier through a half turn so as to reverse the position of the shelf plates and as a consequence effect reversal of the peels and any rolls that may be compressed between the latter.

References Cited by the Examiner

UNITED STATES PATENTS 2,838,184   6/58   MacCurdy _____ 214—1

WALTER A. SCHEEL, *Primary Examiner.*

CHARLES A. WILLMUTH, *Examiner.*